US012444561B2

(12) United States Patent
Sakai et al.

(10) Patent No.: US 12,444,561 B2
(45) Date of Patent: Oct. 14, 2025

(54) ELECTRIC CIRCUIT BREAKER DEVICE THAT EXTINGUISHES AN ARC GENERATED WHEN CONDUCTOR PORTION IS CUT

(71) Applicant: DAICEL CORPORATION, Osaka (JP)

(72) Inventors: Toshiyuki Sakai, Tokyo (JP); Tomohide Fujiwara, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 5 days.

(21) Appl. No.: 18/226,117

(22) Filed: Jul. 25, 2023

(65) Prior Publication Data

US 2023/0368996 A1 Nov. 16, 2023

Related U.S. Application Data

(62) Division of application No. 16/639,926, filed as application No. PCT/JP2018/032962 on Sep. 6, 2018, now Pat. No. 11,756,758.

(30) Foreign Application Priority Data

Sep. 15, 2017 (JP) ................................ 2017-177773

(51) Int. Cl.
*H01H 39/00* (2006.01)
*H01H 71/02* (2006.01)

(52) U.S. Cl.
CPC ...... *H01H 39/006* (2013.01); *H01H 71/0207* (2013.01); *H01H 71/0264* (2013.01)

(58) Field of Classification Search
CPC ............ H01H 39/006; H01H 71/0207; H01H 71/0264; H01H 2039/008; H01H 39/00
(Continued)

(56) References Cited

U.S. PATENT DOCUMENTS 6,222,439 B1 4/2001 Tanigawa et al.
6,295,930 B1 10/2001 Kume
(Continued)

FOREIGN PATENT DOCUMENTS

CN 107077994 A 8/2017
EP 2 996 134 A1 3/2016
(Continued)

*Primary Examiner* — Sreeya Sreevatsa
(74) *Attorney, Agent, or Firm* — Birch, Stewart, Kolasch & Birch, LLP

(57) ABSTRACT

An electric circuit breaker device includes an igniter, a rod-like projectile, and a conductor portion for forming a part of an electric circuit, and an insulating closed space. The conductor portion includes a first and second connection portions and a cut portion at an intermediate portion, and is disposed with a surface of the cut portion. The rod-like projectile has an end portion facing the cut portion. The insulating closed space has an opening portion facing the conductor portion, a closed end surface opposite to the opening portion in the housing axial direction, and four side surfaces between the opening portion and the closed end surface. A width (W1) of the opening portion of the insulating closed space and a width (L1) of the end portion of the rod-like projectile have a relationship of W1>L1 and W1−L1≥0.25 mm.

7 Claims, 6 Drawing Sheets

(58) Field of Classification Search
USPC .......................................................... 335/202
See application file for complete search history.

(56) References Cited

U.S. PATENT DOCUMENTS

| | | | | |
|---|---|---|---|---|
| 6,556,119 | B1 * | 4/2003 | Lell ...................... | H01H 37/323 337/182 |
| 8,716,615 | B2 | 5/2014 | Fukuyama | |
| 10,622,179 | B2 | 4/2020 | Gonthier | |
| 2005/0083164 | A1 | 4/2005 | Caruso et al. | |
| 2005/0083165 | A1 * | 4/2005 | Tirmizi ................ | H01H 39/006 337/157 |
| 2012/0194954 | A1 | 8/2012 | Fukuyama et al. | |
| 2012/0234162 | A1 | 9/2012 | Tirmizi | |
| 2013/0056344 | A1 * | 3/2013 | Borg ...................... | H01H 39/00 200/81 R |
| 2013/0263714 | A1 * | 10/2013 | Ukon ................... | B23D 15/145 83/639.1 |
| 2013/0263715 | A1 | 10/2013 | Ukon et al. | |
| 2014/0061161 | A1 | 3/2014 | Nakamura et al. | |
| 2017/0221662 | A1 * | 8/2017 | Sakai ................... | H01H 39/006 |
| 2017/0263402 | A1 | 9/2017 | Lorenzon et al. | |

FOREIGN PATENT DOCUMENTS

| | | | |
|---|---|---|---|
| JP | 11-232979 | A | 8/1999 |
| JP | 2012-138281 | A | 7/2012 |
| JP | 2014-49300 | A | 3/2014 |
| JP | 2016-85947 | A | 5/2018 |

* cited by examiner

ELECTRIC CIRCUIT BREAKER DEVICE THAT EXTINGUISHES AN ARC GENERATED WHEN CONDUCTOR PORTION IS CUT

CROSS REFERENCE TO RELATED APPLICATIONS

This application is a Continuation of U.S. patent application Ser. No. 16/639,926, filed on Feb. 18, 2020, which is a National Phase of PCT International Application No. PCT/JP2018/032962, filed on Sep. 6, 2018, which claims the benefit of Patent Application No. JP 2017-177773 filed in Japan, on Sep. 15, 2017. The entire contents of which are hereby incorporated by reference.

TECHNICAL FIELD

The present invention relates to an electric circuit breaker device that can be used in electric circuits of vehicles, electric home appliances, and the like.

BACKGROUND ART

In abnormalities and the like in electric circuits of vehicles and electric home appliances, or in a system including the electric circuits, electric circuit breaker devices that break the electric circuits to prevent large damage have been used. The importance of the electric circuit breaker device is particularly great in the electric circuits of electric vehicles. Electric circuit breaker devices are known that contain an igniter, a projectile (piston), a conductor, and the like in a housing (US2005/0083164A, US2005/0083165A, US2012/0234162A, JPH11-232979A, JP2014-49300A, JP2016-85947A, JP2014-49300A).

US2005/0083164A and US2005/0083165A exemplify a material of a housing as a metal, ceramic, and polymer, and describes that certain polymers are preferable (in pages 2 to 3 of US2005/0083164A and page 2 of US2005/0083165A).

In JPH11-232979A, a casing 13 is made of stainless steel (paragraph number 0011).

In JP2014-49300A, a case 30 is formed of a material having an electrical insulating property and high strength (e.g., a resin material) (paragraph 0034). When a polymeric material (resin material) is used, the housing (casing) needs to be thickened in terms of imparting a required strength as can be understood from, for example, FIG. 1 of each of US2005/0083164A, US2005/0083165A, and JP2014-49300A. When the stainless steel casing 13 is used, the increase in mass is large, and the insulating case 14 needs to be arranged in combination, so the structure and assembly are complicated.

In JP2016-85947A, a metallic cylinder is used to reinforce a resin housing to provide an effect that is not provided in US2005/0083164A, US2005/0083165A, US2012/0234162A, JPH11-232979A, and JP2014-49300A.

In JP2014-49300A, an arc extinguishing chamber 32 for extinguishing an arc that occurs when an energized conductor is cut is provided (in claims).

SUMMARY OF INVENTION

The present invention provides an electric circuit breaker device including, in a housing made of a synthetic resin, an igniter, a rod-like projectile made of a synthetic resin, and a conductor portion for forming a part of an electric circuit, the igniter, the rod-like projectile, and the conductor portion being arranged in this order in a cylindrical space formed from a first end portion of the housing toward a second end portion opposite to the first end portion in a housing axial direction, and an insulating closed space between the second end portion of the housing and the conductor portion, wherein the conductor portion is a plate portion including a first connection portion and a second connection portion on both end sides and a cut portion at an intermediate portion, and is disposed with a surface of the cut portion being along a housing width direction orthogonal to the housing axial direction, the rod-like projectile includes an end portion having a cross-sectional shape of a rectangle in the housing width direction and being disposed to face the surface of the cut portion of the conductor portion in the housing axial direction, the insulating closed space has a cross-sectional shape of a rectangle in the housing width direction and includes an opening portion facing the conductor portion, a closed end surface opposite to the opening portion in the housing axial direction, and four side surfaces between the opening portion and the closed end surface, and a width (W1) of the opening portion of the insulating closed space and a width (L1) of the end portion of the rod-like projectile have a relationship of $W1>L1$ and $W1-L1\geq 0.25$ mm.

BRIEF DESCRIPTION OF DRAWINGS

The present invention will be more fully understood from the detailed description given hereinbelow and the accompanying drawings, which are given for explanation only and do not limit the present invention.

DESCRIPTION OF EMBODIMENTS

Figure 1A:
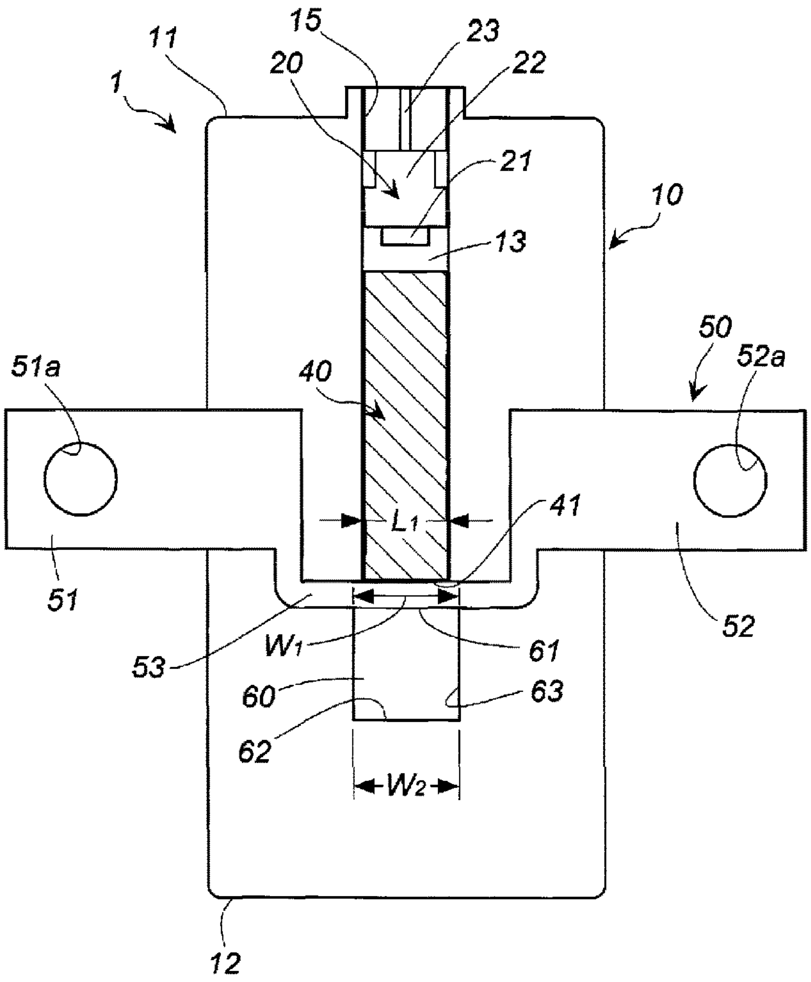
FIG. 1A is an axial direction cross-sectional view of an electric circuit breaker device according to an embodiment of the present invention.

The present invention has an object to provide an electric circuit breaker device that can extinguish an arc generated when a conductor portion is cut.

The electric circuit breaker device according to an embodiment of the present invention can be attached to and used in various electric circuits such as those of batteries of gasoline or diesel vehicles (such as lithium-ion batteries), electric vehicles, electric home appliances, and the like, and can break the electric circuits when abnormalities occur in the electric circuits.

The electric circuit breaker device according to an embodiment of the present invention can be attached alone to the various types of vehicles described above, but may also be attached in such a way that the electric circuit breaker device can be actuated in conjunction with an airbag device mounted on a vehicle, for example. In such a case, when various types of vehicles on which the airbag devices are mounted have accidents, leakage of a large current can be prevented by making the electric circuit breaker device according to an embodiment of the present invention receive actuation signals of the airbag devices and be actuated to break the electric circuit.

The housing is made of a synthetic resin, and includes a cylindrical space formed therein from a first end portion side toward a second end portion side opposite to the first end portion side in a housing axial direction, and the cylindrical space is coupled to an insulating closed space on the second end portion side via a conductor portion. The housing has an external shape determined appropriately in accordance with an attachment site. The housing has a shape, structure, and size capable of accommodating and attaching components such as an igniter, a projectile, and a conductor portion. The housing can also include a first housing from the first end portion to a portion where the conductor portion is provided, and a second housing (bottom clip) from a portion where the conductor portion is provided to the second end portion.

Examples of the igniter include an igniter used in known electric circuit breaker devices, an igniter for a gas generator used in an airbag device of a vehicle, and the like. The igniter is provided with a conductive pin for energizing an ignition portion provided with an igniter charge, and during actuation, combusts the igniter charge by energizing from an external power source to generate a combustion product such as combustion gas or flames.

A rod-like projectile is for receiving pressure of the combustion product generated by the actuation of the igniter, moving axially within the housing, and cutting the conductor portion to break the electric circuit. The rod-like projectile may have an entirely uniform outer diameter (uniform width), or may have an end portion larger or smaller in comparison to the other portions. The end portion of the rod-like projectile is preferably formed in a quadrangular prism shape (i.e., a cross-sectional shape in the housing width direction is rectangular) and has a cross-sectional shape of a square for the purpose of easiness in cutting the rod-like projectile. The rod-like projectile can be made of the same synthetic resin as the housing.

The conductor portion can be the same as those used in known electric circuit breaker devices. The conductor portion is a plate portion including connection portions on both end sides (a first connection portion and a second connection portion) and a cut portion at an intermediate portion, and forms a part of the electric circuit when attached to the electric circuit. A shape of the conductor portion is a plate shape corresponding to a shape and structure of an attaching portion with respect to the housing. The conductor portion is disposed between the cylindrical space and the insulating closed space.

A width (W1) of an opening portion of the insulating closed space in the housing and a width (L1) of the end portion of the rod-like projectile have a relationship of $W1>L1$ and $W1-L1\geq 0.25$ mm. $W1-L1$ is preferably 0.5 mm or more and more preferably 0.8 mm or more, and preferably 2 mm or less and more preferably 1.5 mm or less. If the width (W1) of the opening portion of the insulating closed space and the width (L1) of the end portion of the rod-like projectile have the relationship described above, when the rod-like projectile presses against one side of the cut portion of the conductor portion (on the first end portion side of the housing), at the same time, the other side of the cut portion of the conductor portion (on the second end portion side of the housing) is pressed against in contact with corners on a boundary between the opening portion and four side surfaces of the insulating closed space, so cutting is easy. This allows the output of the igniter that applies pressure to the rod-like projectile to be reduced, and the electric circuit breaker device itself can be also reduced in size.

In a preferred embodiment of the electric circuit breaker device according to the present invention, for the insulating closed space, the width (W1) of the opening portion and a width (W2) of the closed end surface have a relationship of $W1>W2$, and the width (W2) of the closed end surface and the width (L1) of the end portion of the rod-like projectile have a relationship of $W2>L1$.

Because of the relationship $W2>L1$, it is easy to extinguish an arc generated when a conductor portion is cut.

In another preferred embodiment of the electric circuit breaker device according to the present invention, for the insulating closed space, the width (W1) of the opening portion and the width (W2) of the closed end surface have a relationship of $W1>W2$, the width (W2) of the closed end surface and the width (L1) of the end portion of the rod-like projectile have a relationship of $W2<L1$, and the four side surfaces from the opening portion to the closed end surface are continuous inclined surfaces.

Because of the relationships $W1>W2$ and $W2<L1$ and the four side surfaces being inclined surfaces, kinetic energy of the rod-like projectile during actuation can be gradually absorbed, and it is easy to extinguish an arc generated when a conductor portion is cut.

In yet another preferred embodiment of the electric circuit breaker device according to the present invention, for the insulating closed space, the width (W1) of the opening portion, a width (W3) between the side surfaces that oppose each other, and a width (W2) of the closed end surface have a relationship of $W1>W2=W3$, and the width (W2) of the closed end surface and the width (L1) of the end portion of the rod-like projectile have a relationship of $W2>L1$ and $W2-L1\leq 0.25$ mm, and an annular raised section is formed due to a difference in the widths ($W1-W3$) at a boundary between the opening portion and the four side surfaces.

Because of the relationships $W1>W2$, $W2>L1$, and $W2-L1\leq 0.25$ mm, it is easy to extinguish an arc generated when a conductor portion is cut.

In yet another preferred embodiment of the electric circuit breaker device according to the present invention, the rod-like projectile includes a body portion having a large width and the end portion having a width smaller than the body portion, and a portion between the body portion and the end portion includes an inclined surface, for the insulating closed space, the width (W1) of the opening portion, a width (W3) between side surfaces that oppose each other, and a width (W2) of the closed end surface have a relationship of $W1=W3=W2$, and the width (W2) of the closed end surface and the width (L1) of the end portion of the rod-like projectile have a relationship of $W2>L1$, and the width (W2) of the closed end surface and a width (L2) of the body portion of the rod-like projectile have a relationship of $W2-L2\leq 0.25$ mm.

Because of the relationships $W1=W3=W2$, $W2>L1$, and $W2-L2\leq 0.25$ mm, it is easy to extinguish an arc generated when a conductor portion is cut.

In yet another preferred embodiment of the electric circuit breaker device according to the present invention, the rod-like projectile includes a body portion having a large width and the end portion having a width smaller than the body portion, and a portion between the body portion and the end portion includes a raised section surface, for the insulating closed space, the width (W1) of the opening portion, a width (W3) between side surfaces that oppose each other, and a width (W2) of the closed end surface have a relationship of W1=W3=W2, and the width (W2) of the closed end surface and the width (L1) of the end portion of the rod-like projectile have a relationship of W2>L1, and the width (W2) of the closed end surface and a width (L2) of the body portion of the rod-like projectile have a relationship of W2−L2≤0.25 mm.

Because of the relationships W1=W3=W2, W2>L1, and W2−L2≤0.25 mm, it is easy to extinguish an arc generated when a conductor portion is cut.

The electrical circuit breaker device according to the present invention can reduce the output of the igniter for applying pressure to the rod-like projectile because the conductor portion receives actions from both the rod-like projectile and the corners of the opening portion of the insulating closed space to be susceptible to being cut during actuation.

EMBODIMENTS OF THE INVENTION (1) Electric Circuit Breaker Device 1 in FIG. 1

A housing (resin housing) 10 made of a synthetic resin includes a cylindrical space 13 that penetrates from a first end portion 11 to a conductor portion 50 on a second end portion 12 side opposite to the first end portion 11 side in the housing axial direction. A connector fitting portion 15 for connecting an igniter 20 to a power source through a lead wire during use is attached on the first end portion 11 side of the cylindrical space 13. In the cylindrical space 13, the igniter 20, a rod-like projectile 40 made of a synthetic resin, and the conductor portion 50 are arranged in this order from the first end portion 11 side toward the second end portion 12 side. The housing 10, the cylindrical space 13, the igniter 20, and the rod-like projectile 40 are arranged with their respective central axes being aligned.

The igniter 20 includes a resin portion 22 in which a portion of an igniter body including an ignition portion 21 and a conductive pin 23 is surrounded by a resin, and the ignition portion 21 protrudes from the resin portion 22.

The rod-like projectile 40 is arranged to be movable within the cylindrical space 13 and includes an end portion 41, the end portion 41 having a cross-sectional shape of a rectangle in the housing width direction. The cross-sectional shape of the rod-like projectile 40 excluding that of the end portion 41 is not specifically limited. A cylinder can be disposed between the housing and the rod-like projectile 40 as needed for reinforcing the housing 10. The cylinder is preferably made of a metal such as stainless steel or aluminum, and a fiber reinforced resin such as a carbon fiber reinforced resin.

The conductor portion 50 is for forming a part of an electric circuit when the electric circuit breaker device 1 is attached to the electric circuit. The conductor portion 50 is a plate portion including a first connection portion 51 and a second connection portion 52 on both end sides, and a cut portion 53 at an intermediate portion. The first connection portion 51 (a hole 51*a* of the first connection portion 51) and the second connection portion 52 (a hole 52*a* of the second connection portion 52) are for connecting to other conductors (for example, lead wires) in the electric circuit, and the cut portion 53 is to be cut for breaking the electric circuit during actuation. The conductor portion 50 is disposed with a surface of the cut portion 53 being along in the width direction of the housing 10. The surface of the cut portion 53 of the conductor portion 50 faces the end portion 41 of the rod-like projectile 40. In FIG. 1, the surface of the cut portion 53 and the end portion 41 abut against each other, but may face each other at a distance.

An insulating closed space 60 is formed between the conductor portion 50 and the second end portion 12 of the housing. The insulating closed space 60 is a space with a cross-sectional shape of a square in the housing width direction, and includes an opening portion 61 facing the conductor portion 50, a closed end surface 62 opposite to the opening portion 61 in the housing axial direction, and four side surfaces 63 between the opening portion 61 and the closed end surface 62. Corners 64 each having an angle of about 90 degrees are formed at a boundary portion between the opening portion 61 and four side surfaces 63. A width (W1) of the opening portion 61 of the insulating closed space 60 and a width (L1) of the end portion 41 of the rod-like projectile 40 have a relationship of W1>L1 and W1−L1=1 mm. In the insulating closed space 60, the width (W1) of the opening portion 61, a width (W3) between two opposing side surfaces 63, and a width (W2) of the closed end surface 62 have a relationship of W1=W3=W2.

Examples of a manufacturing method applicable to the electric circuit breaker device illustrated in FIG. 1 include a manufacturing method in which injection molding is performed in a state where the conductor portion 50 is disposed in a mold, and thereafter, the necessary components are inserted from one end side of the cylindrical space 13, and a manufacturing method in which injection molding is performed in a state where a conductor portion is disposed in a mold, the first housing from the first end portion 11 to a portion where the conductor portion 50 is provided is molded, and thereafter, injection molding is performed in a state where the molded resultant in which the necessary components are inserted from both end sides of the cylindrical space 13 is again disposed in the mold, and then, the second housing (bottom clip) from the portion where the conductor portion 50 is provided to the second end portion 12 is molded.

Next, operations when the electric circuit breaker device 1 illustrated in FIG. 1 is arranged in a part of an electric circuit (a battery) of an electric vehicle. The electric circuit breaker device 1 illustrated in FIG. 1 can be combined with a sensor or the like that detects an abnormal current to automatically initiate an operation when an abnormal current flows to the electric circuit, for example, and can also be actuated artificially.

In a case that the electric circuit breaker device 1 is arranged in the electric circuit, the lead wire constituting the electric circuit is connected to the electric circuit breaker device 1 at the hole 51*a* of the first connection portion 51 and the hole 52*a* of the second connection portion 52 of the conductor portion 50. When an abnormality occurs in the electric circuit, the igniter 20 operates to generate a combustion product from the ignition portion 21. The combustion product generated by the ignition portion 21 travels straight within the cylindrical space 13 to impinge on the rod-like projectile 40.

Figure 1B:
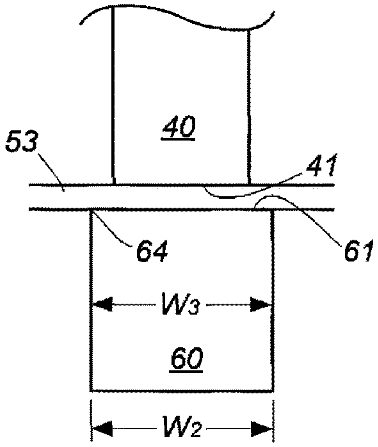
FIG. 1B is a partial cross-sectional view of FIG. 1A.
Figure 1C:
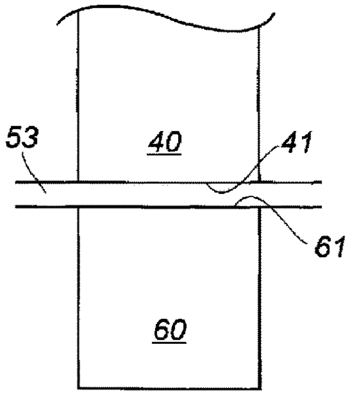
FIG. 1C is a cross-sectional view corresponding to FIG. 1B in the related art.

The end portion 41 of the rod-like projectile 40 that has undergone pressure by the combustion product moves in the axial direction to cut the cut portion 53 of the conductor portion 50. At this time, as illustrated in FIGS. 1A and 1B, because of the relationships W1>L1 and W1−L1=1 mm, when the end portion 41 of the rod-like projectile 40 presses against the cut portion 53 of the conductor portion 50, at the same time, the cut portion 53 of the conductor portion 50 is pressed against in contact with the corners 64 on the boundary between the opening portion 61 and four side surfaces 63, so the cut portion 53 receives actions from both sides in the housing axial direction and is easy to cut. This allows the output of the igniter 20 that applies pressure to the rod-like projectile 40 to be reduced, and the electric circuit breaker device 1 itself can be also reduced in size. Note that, in the case of W1=L1 or W1>L1, in the case of W1−L1≤0.5 mm, the cutting is difficult because of a state illustrated in FIG. 1C, therefore, a larger force (a larger output of the igniter) is required to cut the conductor portion 50.

Thereafter, the end portion 41 of the rod-like projectile and a cut piece of the cut portion 53 are moved to the closed end surface 62 and held electrically insulated. Through this operation, the first connection portion 51 and the second connection portion 52 on both ends of the conductor portion 50 are electrically disconnected, so the electric circuit on which the device 1 is disposed is broken.

Figure 2:
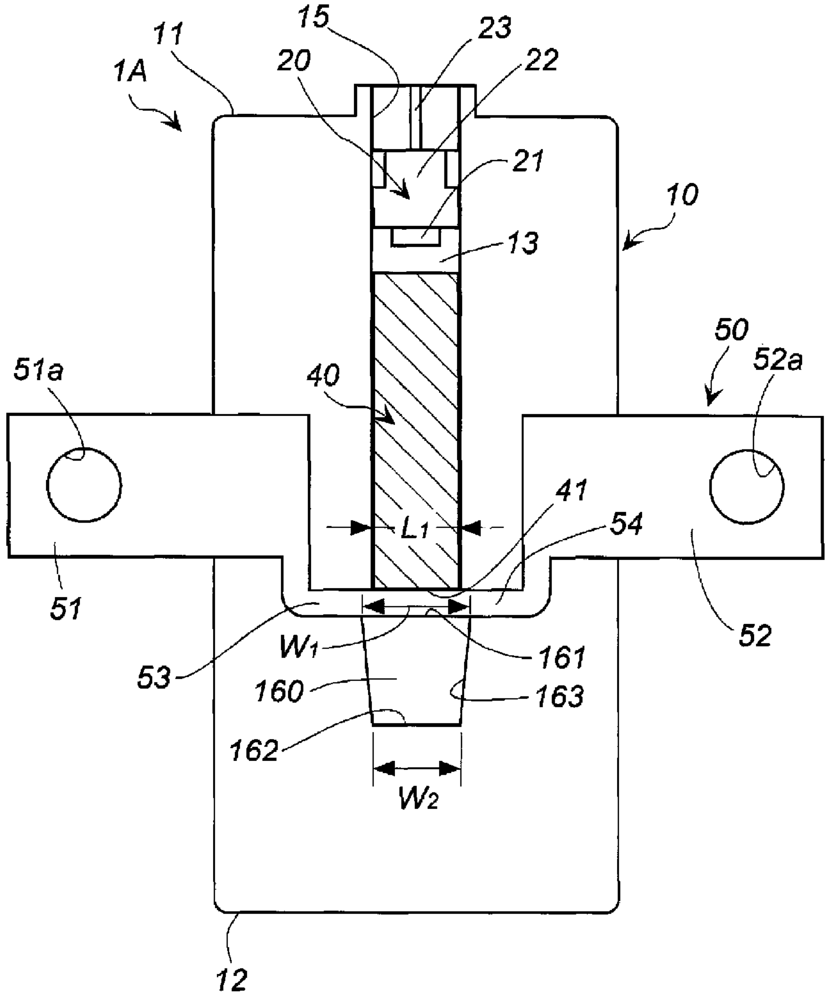
FIG. 2 illustrates an axial direction cross-sectional view of an electric circuit breaker device in an embodiment different from that illustrated in FIG. 1A.

(2) Electric Circuit Breaker Device 1A in FIG. 2

An electric circuit breaker device 1A illustrated in FIG. 2 is the same as the electric circuit breaker device 1 illustrated in FIG. 1, except that a shape of an insulating space 160 is different.

The insulating closed space 160 is formed between the conductor portion 50 and the second end portion 12 of the housing. The insulating closed space 160 is a space with a cross-sectional shape of a square in the housing width direction, and includes an opening portion 161 facing the conductor portion 50, a closed end surface 162 opposite to the opening portion 161 in the housing axial direction, and four side surfaces 163 between the opening portion 161 and the closed end surface 162. Corners each having an angle less than about 80 to 90 degrees are formed at a boundary portion between the opening portion 161 and four side surfaces 163.

In the insulating closed space 160, a width (W1) of the opening portion 161 and a width (W2) of the closed end surface 162 have a relationship of W1>W2, and four side surfaces 163 from the opening portion 161 to the closed end surface 162 are continuous inclined surfaces. The width (W1) of the opening portion 161 of the insulating closed space 160 and a width (L1) of the end portion of the rod-like projectile 40 have a relationship of W1>L1 and W1−L1=1 mm, and the width (W2) of the closed end surface 162 and the width (L1) of the end portion 141 of the rod-like projectile have a relationship of W2<L1.

When the igniter 20 of the electric circuit breaker device 1A illustrated in FIG. 2 operates, the end portion 41 of the rod-like projectile 40 that has undergone pressure by the combustion product moves in the housing axial direction to cut the cut portion 53 of the conductor portion 50. At this time, because of the relationships W1>L1 and W1−L1=1 mm, when the end portion 41 of the rod-like projectile 40 presses against the cut portion 53 of the conductor portion 50, at the same time, the cut portion 53 of the conductor portion 50 is pressed against in contact with the corners on a boundary between the opening portion 161 and four side surfaces 163, so the cut portion 53 receives actions from both sides in the housing axial direction and is easy to cut. This allows the output of the igniter 20 that applies pressure to the rod-like projectile 40 to be reduced, and the electric circuit breaker device 1 itself can be also reduced in size.

Thereafter, the end portion 41 of the rod-like projectile and a cut piece of the cut portion 53 are moved to the closed end surface 162 and held electrically insulated. Through this operation, the first connection portion 51 and the second connection portion 52 on both ends of the conductor portion 50 are electrically disconnected, so the electric circuit on which the device 1 is disposed is broken. When the conductor portion 50 is cut in such a process and an arc is generated between the first connection portion 51 and the second connection portion 52, the arc is extinguished because of the relationship W2<L1. In addition, since the rod-like projectile 40 moves forward from the opening portion 161 toward the closed end surface 162 while gradually increasing the contact strength with the side surfaces (inclined surfaces) 163, the kinetic energy is gradually absorbed, and the impact on the housing 10 is mitigated. As a result, the housing 10 and the device 1A can be reduced in size.

Figure 3:
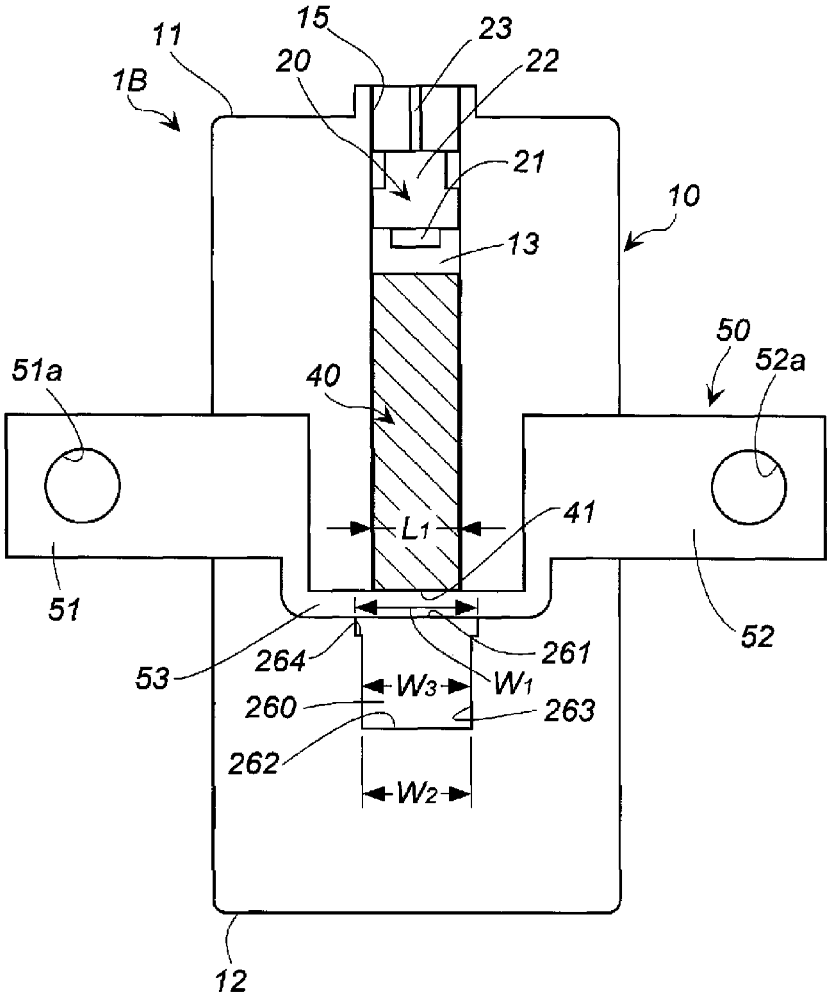
FIG. 3 illustrates an axial direction cross-sectional view of an electric circuit breaker device in an embodiment further different from that illustrated in FIG. 1A.

(3) Electric Circuit Breaker Device 1B in FIG. 3

An electric circuit breaker device 1B illustrated in FIG. 3 is the same as the electric circuit breaker device 1 illustrated in FIG. 1, except that a shape of an insulating space 260 is different.

In the insulating closed space 260, a width (W1) of an opening portion 261, a width (W3) between side surfaces 263 that oppose each other, and a width (W2) of a closed end surface 262 have a relationship of W1>W2=W3. Therefore, an annular raised section 264 is formed at a boundary between the opening portion 261 and four side surfaces 263 due to a difference in the widths (W1−W3). In the insulating closed space 260 further, the width W2 of the closed end surface 262 and a width (L1) of the end portion 41 of the rod-like projectile 40 have a relationship of W2>L1 and W2−L1≤0.25 mm. Corners each having an angle of about 90 degrees are formed at a boundary portion between the opening portion 261 and four side surfaces 263 of the insulating space 260.

When the igniter 20 of the electric circuit breaker device 1B illustrated in FIG. 3 operates, the end portion 41 of the rod-like projectile 40 that has undergone pressure by the combustion product moves in the housing axial direction to cut the cut portion 53 of the conductor portion 50. At this time, because of the relationships W1>L1 and W1−L1=1 mm, when the end portion 41 of the rod-like projectile 40 presses against the cut portion 53 of the conductor portion 50, at the same time, the cut portion 53 of the conductor portion 50 is pressed against in contact with the corners on the boundary between the opening portion 261 and four side surfaces 263, so the cut portion 53 receives actions from both sides in the housing axial direction and is easy to cut. This allows the output of the igniter 20 that applies pressure to the rod-like projectile 40 to be reduced, and the electric circuit breaker device 1 itself can be also reduced in size.

Thereafter, the end portion 41 of the rod-like projectile and a cut piece of the cut portion 53 are moved to the closed end surface 262 and held electrically insulated. Through this operation, the first connection portion 51 and the second connection portion 52 on both ends of the conductor portion 50 are electrically disconnected, so the electric circuit on which the device 1B is disposed is broken. When the conductor portion 50 is cut in such a process and an arc is generated between the first connection portion 51 and the second connection portion 52, the arc is extinguished because of the relationships W2>L1 and W2−L1≤0.25 mm.

Figure 4:
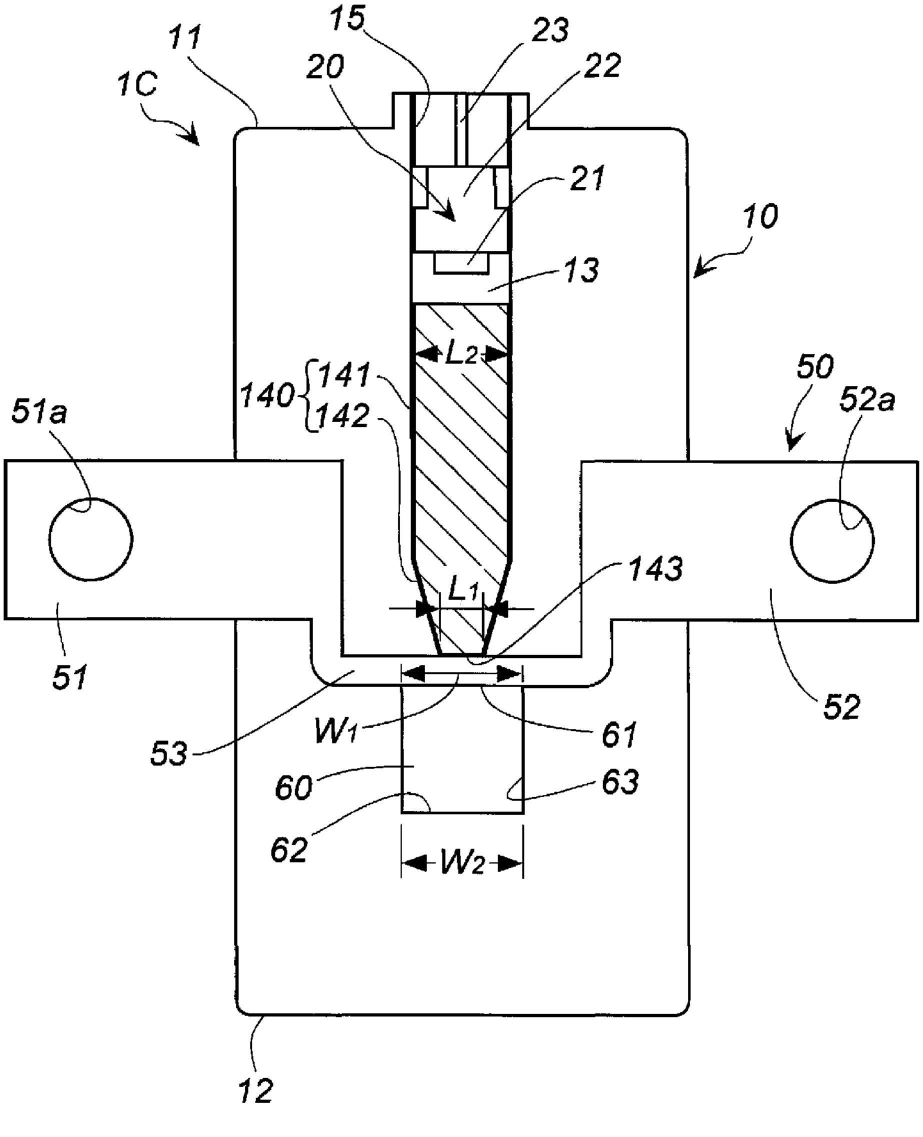
FIG. 4 illustrates an axial direction cross-sectional view of an electric circuit breaker device in an embodiment further different from that illustrated in FIG. 1A.

(4) Electric Circuit Breaker Device 1C in FIG. 4

An electric circuit breaker device 1C illustrated in FIG. 4 is the same as the electric circuit breaker device 1 illustrated in FIG. 1, except that a shape of an end portion 142 of a rod-like projectile 140 is different.

The rod-like projectile 140 includes a body portion 141 having a large width and an inclined end portion 142 having a width that is continuously smaller toward an end surface 143. The inclined end portion 142 including the end surface 143 has a cross-sectional shape of a square in the housing width direction, and a width of the end surface 143 is L1.

When the igniter 20 of the electric circuit breaker device 1C illustrated in FIG. 4 operates, the end surface 143 of the rod-like projectile 140 that has undergone pressure by the combustion product moves in the housing axial direction to cut the cut portion 53 of the conductor portion 50. At this time, because of the relationships W1>L1 and W1−L1=1 mm, when the end surface 143 of the rod-like projectile 140 presses against the cut portion 53 of the conductor portion 50, at the same time, the cut portion 53 of the conductor portion 50 is pressed against in contact with the corners on the boundary between the opening portion 61 and four side surfaces 63, so the cut portion 53 receives actions from both sides in the housing axial direction and is easy to cut. This allows the output of the igniter 20 that applies pressure to the rod-like projectile 140 to be reduced, and the electric circuit breaker device 1 itself can be also reduced in size.

Thereafter, the end surface 143 of the rod-like projectile and a cut piece of the cut portion 53 are moved to the closed end surface 62 and held electrically insulated. Through this operation, the first connection portion 51 and the second connection portion 52 on both ends of the conductor portion 50 are electrically disconnected, so the electric circuit on which the device 1C is disposed is broken. When the conductor portion 50 is cut in such a process and an arc is generated between the first connection portion 51 and the second connection portion 52, the arc is extinguished because of the relationships W2>L1 and W2−L2≤0.25 mm.

Figure 5:
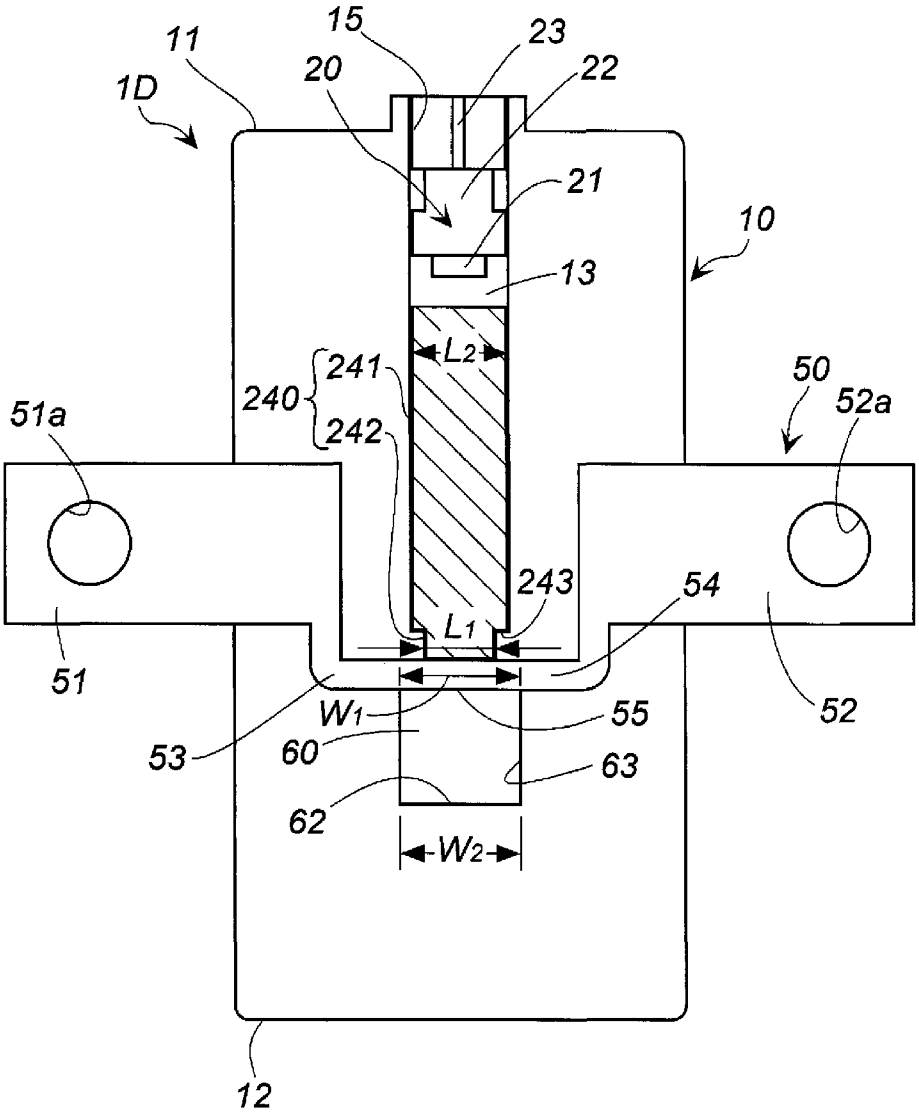
FIG. 5 illustrates an axial direction cross-sectional view of an electric circuit breaker device in an embodiment further different from that illustrated in FIG. 1A.

(5) Electric Circuit Breaker Device 1D in FIG. 5

An electric circuit breaker device 1D illustrated in FIG. 5 is the same as the electric circuit breaker device 1 illustrated in FIG. 1, except that a shape of a rod-like projectile 240 is different. The rod-like projectile 240 includes a body portion 241 having a large width and an end portion 242 having a width smaller than the body portion 241, and a portion between the body portion 241 and the end portion 242 includes a raised section surface 243. The end portion 241 has a cross-sectional shape of a square in the housing width direction, and a width of the end portion 242 is L1.

When the igniter 20 of the electric circuit breaker device 1D illustrated in FIG. 5 operates, the end portion 242 of the rod-like projectile 240 that has undergone pressure by the combustion product moves in the housing axial direction to cut the cut portion 53 of the conductor portion 50. At this time, because of the relationships W1>L1 and W1−L1=1 mm, when the end portion 242 of the rod-like projectile 240 presses against the cut portion 53 of the conductor portion 50, at the same time, the cut portion 53 of the conductor portion 50 is pressed against in contact with the corners on the boundary between the opening portion 61 and four side surfaces 63, so the cut portion 53 receives actions from both sides in the housing axial direction and is easy to cut. This allows the output of the igniter 20 that applies pressure to the rod-like projectile 240 to be reduced, and the electric circuit breaker device 1 itself can be also reduced in size.

Thereafter, the end portion 242 of the rod-like projectile 240 and a cut piece of the cut portion 53 are moved to the closed end surface 62 and held electrically insulated. Through this operation, the first connection portion 51 and the second connection portion 52 on both ends of the conductor portion 50 are electrically disconnected, so the electric circuit on which the device 1D is disposed is broken. When the conductor portion 50 is cut in such a process and an arc is generated between the first connection portion 51 and the second connection portion 52, the arc is extinguished because of the relationships W2>L1 and W2−L2≤0.25 mm.

Figure 6:
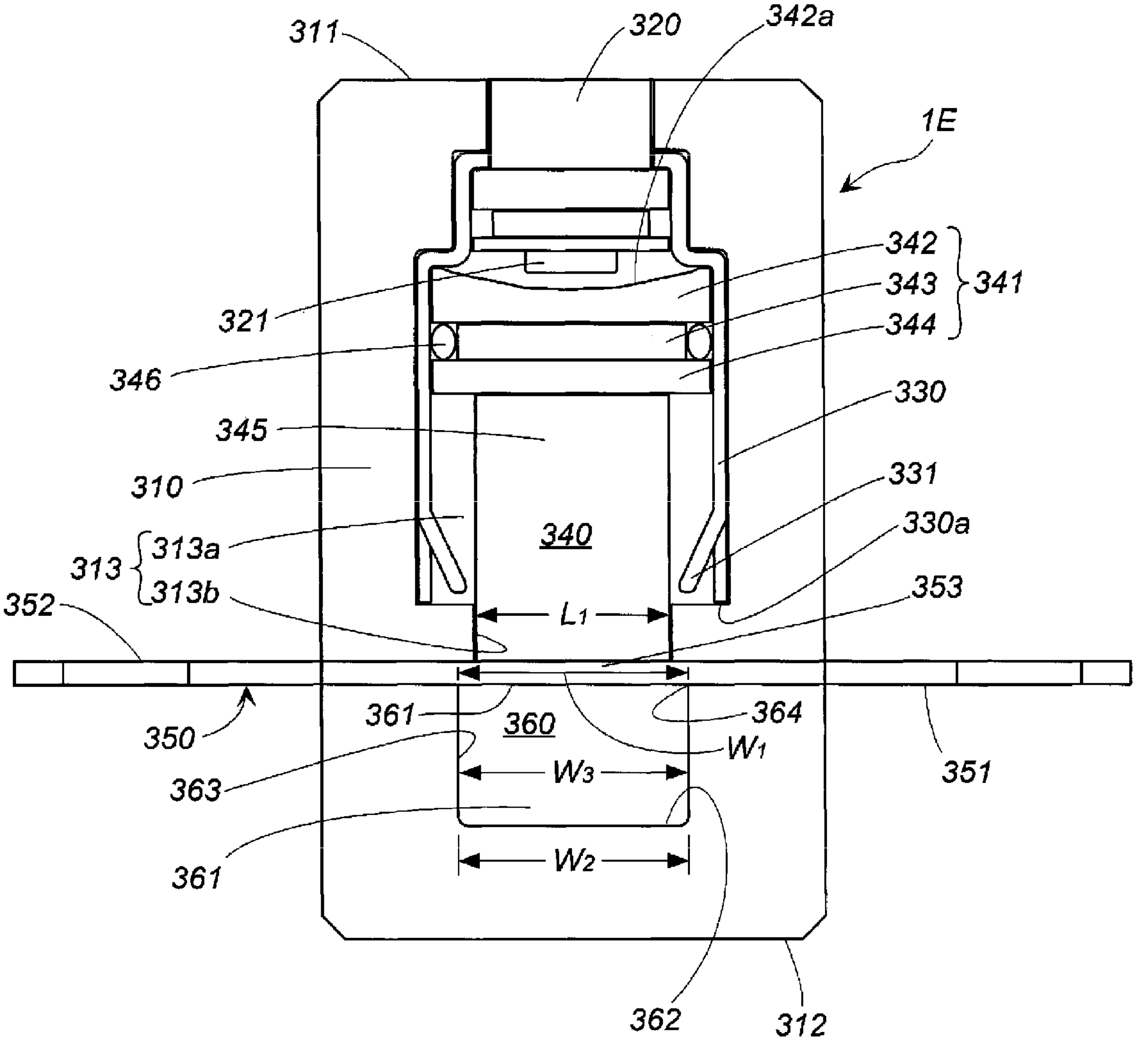
FIG. 6 illustrates an axial direction cross-sectional view of an electric circuit breaker device in an embodiment further different from that illustrated in FIG. 1A.

(6) Electric Circuit Breaker Device 1E in FIG. 6

An electric circuit breaker device 1E illustrated in FIG. 6 is substantially the same as the electric circuit breaker device 1 illustrated in FIG. 1, except that a shape of a rod-like projectile 340, a shape of a cylindrical space 313, and a shape of a conductor portion 350 are different from those of the electric circuit breaker device 1 illustrated in FIG. 1, and a cylinder 330 is used.

A housing (resin housing) 310 made of a synthetic resin includes a cylindrical space 313 that penetrates from a first end portion 311 to the conductor portion 350 on a second end portion 312 side. The cylindrical space 313 includes a large diameter cylindrical space **313*a* on the first end portion side and a small diameter cylindrical space 313*b* on the second end portion 312** side.

The rod-like projectile 340 includes a base portion 341 and a rod portion 345 with an outer diameter of the base portion 341 being larger than an outer diameter of the rod portion 345. The base portion 341 has a cross-sectional shape of a circle in the housing width direction, and the rod portion 345 has a cross-sectional shape of a rectangle in the housing width direction. The base portion 341 includes a first base portion 342 facing an igniter 320, a third base portion 344 contacting the rod portion 345, and a second base portion 343 disposed therebetween. A surface of the first base portion 342 on the igniter 320 side includes a concave curved surface with the center portion being deepest, and is prone to receiving the pressure generated by the igniter 320 operating. Outer diameters of the first base portion 342 and the third base portion 344 are substantially the same, and are abutted against an inner circumferential surface of the cylinder 330. An outer diameter of the second base portion 343 is smaller than the outer diameters of the first base portion 342 and third base portion 344. Therefore, an O-ring 346 is disposed in an annular space around the second base portion 343 formed due to the difference in the outer diameter.

The cylinder 330 is for reinforcing the housing 310, and made of a metal such as stainless steel or aluminum, and a fiber reinforced resin such as a carbon fiber reinforced resin. The cylinder 330 has a cross-sectional shape of a circle in the housing width direction. The cylinder 330 surrounds an ignition portion 321 of the igniter 320 and the projectile 340, and is press-fitted into the cylindrical space 313 to be fixed not to move in the axial direction. The cylinder 330 surrounds an ignition portion 321 of the igniter 320 and the projectile 340, and is press-fitted into the cylindrical space 313 to be fixed not to move in the axial direction. The cylinder 330 is provided with a plurality of sets of two cuts formed at predetermined intervals on a second end portion **330*a* side. The sets of two cuts disposed at predetermined intervals are bent inward, and thus, each bent portion functions as a guide 331 of the rod portion 345**.

The conductor portion 350 is for forming a part of an electric circuit when the device 1E is attached to the electric circuit. The conductor portion 350 is a plate portion including a first connection portion 351 and a second connection portion 352 on both end sides, and a cut portion 353 at an intermediate portion. The first connection portion 351 and the second connection portion 352 are for connecting to other conductors (for example, lead wires) in the electric circuit, and the cut portion 353 is to be cut for breaking the electric circuit during actuation.

The conductor portion 350 is disposed with a surface of the cut portion 353 being orthogonal to the width direction of the housing 310. The surface of the cut portion 353 of the conductor portion 350 faces an end surface of the rod portion 345 of the projectile 340. In FIG. 6, the surface of the cut portion 353 and the end surface of the rod portion 345 abut against each other, but may face each other at a distance.

An insulating closed space 360, which corresponds to the insulating closed space 60 in FIG. 1, is formed between the conductor portion 350 and the second end portion 312 of the housing. The insulating closed space 360 is a space with a cross-sectional shape of a square in the housing width direction, and includes an opening portion 361 facing the conductor portion 350, a closed end surface 362 opposite to the opening portion 361 in the housing axial direction, and four side surfaces 363 between the opening portion 361 and the closed end surface 362. Corners 364 each having an angle of about 90 degrees are formed at a boundary portion between the opening portion 361 and four side surfaces 363.

A width (W1) of the insulating closed space 360 (a distance between the side surfaces 363 that oppose each other) and a width (L1) of the rod portion 345 of the rod-like projectile 340 have a relationship of W1>L1 and W1−L1=1 mm.

Examples of a manufacturing method applicable to the electric circuit breaker device 1E illustrated in FIG. 6 include a manufacturing method in which injection molding is performed in a state where a conductor portion is disposed in a mold, and thereafter, the necessary components are inserted from one end side of the cylindrical space 313, and a manufacturing method in which injection molding is performed in a state where a conductor portion is disposed in a mold, the first housing from the first end portion 311 to a portion where the conductor portion 350 is provided is molded, and thereafter, injection molding is performed in a state where the molded resultant in which the necessary components are inserted from both end sides of the cylindrical space 313 is again disposed in the mold, and then, the second housing (bottom clip) from the portion where the conductor portion 350 is provided to the second end portion 312 is molded.

When the electric circuit breaker device 1E in FIG. 6 is actuated, the electric circuit breaker device 1E operates in the same manner as the electric circuit breaker device 1 illustrated in FIG. 1 to cut the conductor portion 350, and then, the first connection portion 351 and the second connection portion 352 on both ends of the conductor portion 350 are electrically disconnected, so the electric circuit on which the device 1E is disposed is broken. In the embodiment in FIG. 6, because of the relationships W1>L1 and W1−L1=1 mm, when the end portion of the rod-like projectile 340 presses against a cut portion 153 of a conductor portion 150, at the same time, the cut portion 353 of the conductor portion 350 is pressed against in contact with the corners 364 on the boundary between the opening portion 361 and four side surfaces 363, so the cut portion 353 receives actions from both sides in the housing axial direction and is easy to cut. This allows the output of the igniter 320 that applies pressure to the rod-like projectile 340 to be reduced, and the electric circuit breaker device 1E itself can be also reduced in size.

The electric circuit breaker device according to an embodiment of the present invention is suited for various electric circuits, for example, electric circuits including vehicle batteries (for example, lithium-ion batteries), electric circuits of electric vehicles, and electric circuits of electric home appliances, and is particularly suited for electric circuits including vehicle batteries (for example, lithium-ion batteries).

The present invention has been described as above. Of course, the present invention includes various forms of modifications within the scope thereof, and these modifications do not depart from the scope of the invention. All of what a person with ordinary skill in the art will clearly consider as a variation of the present invention is within the scope of the claims set forth below.

The invention claimed is:

1. An electric circuit breaker device comprising:

in a housing made of a synthetic resin, an igniter, a rod-like projectile made of a synthetic resin, and a conductor portion for forming a part of an electric circuit, the igniter, the rod-like projectile, and the conductor portion being arranged in this order in a cylindrical space formed from a first end portion of the housing toward a second end portion opposite to the first end portion in a housing axial direction, and an insulating closed space between the second end portion of the housing and the conductor portion, wherein the conductor portion is a plate portion including a first connection portion and a second connection portion on both end sides and a cut portion at an intermediate portion, and is disposed with a surface of the cut portion being along a housing width direction orthogonal to the housing axial direction, the rod-like projectile includes an end portion having a cross-sectional shape of a rectangle in the housing width direction and being disposed to face the surface of the cut portion of the conductor portion in the housing axial direction, the insulating closed space has a cross-sectional shape of a rectangle in the housing width direction and includes an opening portion facing the conductor portion, a closed end surface opposite to the opening portion in the housing axial direction, and four side surfaces between the opening portion and the closed end surface, a width (W1) of the opening portion of the insulating closed space and a width (L1) of the end portion of the rod-like projectile have a relationship of W1>L1 and W1-L1≥0.25 mm, for the insulating closed space, the width (W1) of the opening portion, a width (W3) between the side surfaces that oppose each other, and a width (W2) of the closed end surface have a relationship of W1>W2=W3, and the width (W2) of the closed end surface and the width (L1) of the end portion of the rod-like projectile have a relationship of W2>L1 and W2-L1≤0.25 mm, and an annular raised section is formed due to a difference in the widths (W1-W3) at a boundary between the opening portion and the four side surfaces, and wherein the width (W1) of the opening portion of the insulating closed space and the width (L1) of the end portion of the rod-like projectile have a relationship of 2.0 mm>W1-L1≥0.25 mm.

2. The electric circuit breaker device according to claim 1, wherein activation of the igniter causes the end portion of the rod-like projectile to press a part of the cut portion of the conductor portion and into the opening portion of the insulated closed space and thereby cut off the pressed portion from the rest part of the cut portion and to move that portion as a separate cut piece to the closed end surface within the insulated closed space.

3. The electric circuit breaker device according to claim 1, wherein the width of the rod-like projectile is uniform throughout an entire length of the rod-like projectile.

4. The electric circuit breaker device according to claim 1, wherein a length between the opening portion of the insulating closed space and the closed end surface is smaller than a length of the rod-like projectile.

5. The electric circuit breaker device according to claim 1, wherein each of the first and second connection portions includes a circular hole having a center axis extending in a direction perpendicular to a longitudinal direction of the rod-like projectile.

6. The electric circuit breaker device according to claim 1, wherein the conductor portion has a U-shape such that the intermediate portion is positioned lower than the first connection portion and the second connection portion.

7. The electric circuit breaker device according to claim 1, wherein a width of the intermediate portion is larger than the width (L1) of the end portion of the rod-like projectile.

* * * * *